United States Patent [19]

Hoekstra

[11] Patent Number: 4,899,499
[45] Date of Patent: Feb. 13, 1990

[54] CABLE ANCHORING APPARATUS

[76] Inventor: Charles F. Hoekstra, 4294 Hopkins Lake Dr., Duluth, Ga. 30136

[21] Appl. No.: 268,764

[22] Filed: Nov. 8, 1988

Related U.S. Application Data

[63] Continuation-in-part of Ser. No. 44,319, Apr. 30, 1987, abandoned.

[51] Int. Cl.$^4$ ............................................. E04H 12/20
[52] U.S. Cl. .......................................... 52/146; 403/78
[58] Field of Search ................. 52/149, 223 R, 223 L, 52/705, 146, 148; 403/78, 43; 29/175.1

[56] References Cited

U.S. PATENT DOCUMENTS

| | | | |
|---|---|---|---|
| 166,286 | 8/1875 | Merrill | 29/175.1 |
| 1,145,462 | 7/1915 | Barton | 52/705 |
| 1,814,609 | 7/1931 | Smith | 403/78 |
| 1,829,954 | 11/1931 | Randall | |
| 2,880,608 | 4/1959 | Boll et al. | |
| 2,962,129 | 11/1960 | Walton | 52/149 |
| 3,049,775 | 8/1962 | Ondeck | 24/335 |
| 3,408,783 | 11/1968 | Rice | 52/223 |
| 3,509,670 | 5/1970 | Boll | 52/99 |
| 3,798,856 | 3/1974 | Gloskowski | 52/127 |
| 3,922,831 | 12/1975 | Fischer | 52/704 |
| 4,055,929 | 11/1977 | Stancati et al. | 52/705 |
| 4,084,362 | 4/1978 | Piazza | 52/309.2 |
| 4,412,407 | 11/1983 | Melfi et al. | 52/699 |
| 4,620,406 | 11/1986 | Hügel et al. | 52/704 |

FOREIGN PATENT DOCUMENTS 201809  1/1955  Australia ............................... 52/149

*Primary Examiner*—James L. Ridgill, Jr.
*Attorney, Agent, or Firm*—Thomas & Kennedy

[57] ABSTRACT

Apparatus for anchoring an end of a cable to a structure like a concrete pillar comprises a tubular body having an opening in one end into which an end of a cable may be inserted. Means are provided for gripping an end of a cable within the tubular body. A threaded post is rotatably mounted to the other end of said body. The apparatus also includes an insert that is adapted to be embedded in the concrete structure to which insert the post may be threaded.

13 Claims, 2 Drawing Sheets

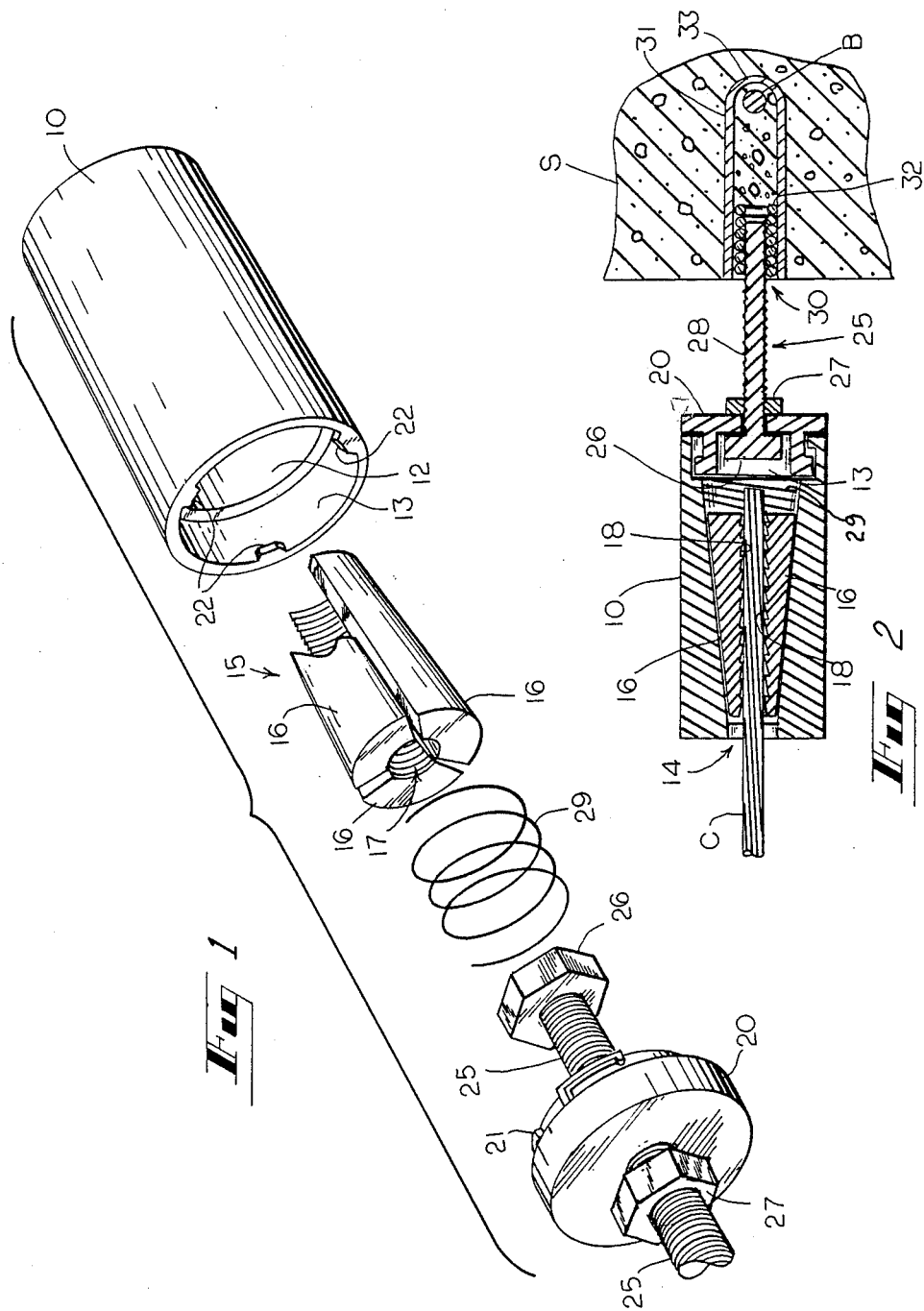

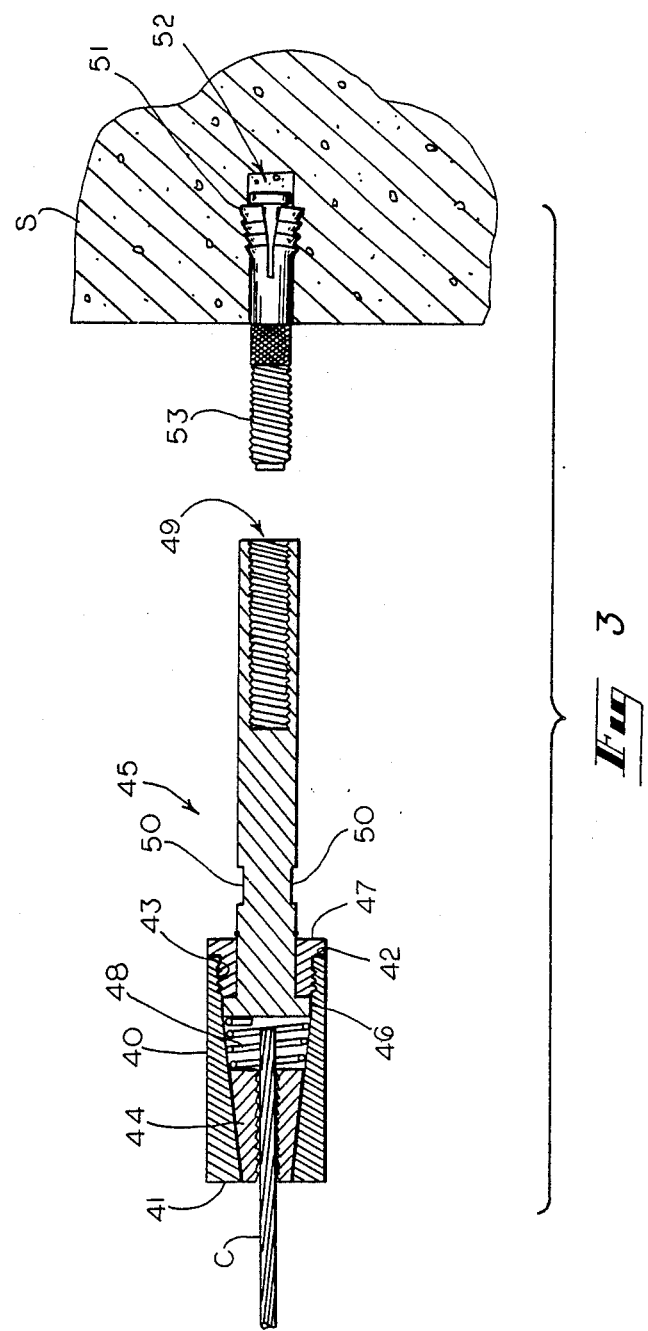

CABLE ANCHORING APPARATUS

REFERENCE TO RELATED APPLICATION

This is a continuation-in-part of application Ser. No. 044,319 filed Apr. 30, 1987 now abandoned.

TECHNICAL FIELD

This invention relates to methods and apparatuses for anchoring the ends of cables to structures such as concrete pillars, posts and the like.

BACKGROUND OF THE INVENTION

Cables, such as those used as pedestrian safety lines beside parking garage ramps, are commonly erected so as to span building structures such as concrete pillars. This is commonly done by providing a pillar with a tube that extends completely through it from one side to a countersink formed in the other side. This is done by locating a plastic tube so that it almost spans the side of forms used in constructing the pillar, and by removably locating a countersink form at one end of the tube. Thus, once concrete is poured into the forms the tube becomes embedded and forms a portion of the structure itself once the concrete sets. In erecting a cable to such a pillar it is passed through the tube and secured under tension to an anchor mounted in the countersink in the opposite side of the pillar. The countersink itself is then filled with concrete so as to cover the anchor.

The just described cable erection procedure has long proven to be difficult to conduct and far from satisfactory. For example, the construction of the pillar itself is impeded by having to provide it with the tube and countersink at the time it is formed. In addition, concrete must be made available for application to the pillar after it has been formed and a cable anchored to it. Furthermore, in the event the cable is to be taken down from the pillar the countersink must be chiseled out of the concrete in order to regain access to the anchor to release the cable. Fresh concrete must thereafter be applied to refill the chiseled out section.

Accordingly, it is seen that cable anchoring apparatus is needed that overcomes the just described problems and limitations of those that presently exist. It is to the provision of such a cable anchoring apparatus that the present invention is directed.

SUMMARY OF THE INVENTION

In one form of the invention apparatus for anchoring the end of cable to a concrete structure or the like comprises a tubular body having an opening in one end into which an end of a cable may be inserted. Means are provided for gripping the end of the cable within the tubular body. A threaded post is rotatably mounted to the other end of the body. An insert is also provided which is adapted to be embedded in the concrete structure into which insert the post may be threaded.

In another form of the invention apparatus for anchoring the end of a cable comprises a chuck having a tubular body formed with a bore that has a section which tapers inwardly towards a cable insert end. Annular cable gripper means are positioned within the tapered bore section of the tubular body. A threaded bolt has a bolt head rotatably held within an end of the chuck body located opposite to the cable insert end from which head a threaded bolt shank extends to the exterior of the chuck body. Insert means are also provided that is adapted to be embedded in a support structure into which the bolt may be threaded.

BRIEF DESCRIPTION OF THE DRAWINGS

FIG. 1 is an exploded view, in perspective, of cable anchoring apparatus that embodies principles of the present invention which is shown without an insert element thereof.

FIG. 2 is an assembled side view, in cross section, of the apparatus illustrated in FIG. 1 together with an insert element which is shown embedded in a concrete structure. The apparatus is shown here anchoring a cable to the structure.

FIG. 3 is a partially assembled side view, in cross section, of another embodiment of the invention.

DETAILED DESCRIPTION

With reference next to the drawing, there is shown apparatus for anchoring the end of a cable C to a concrete structure S such as a concrete pillar. The apparatus comprises an elongated, tubular chuck body 10 that has a conical bore section 12 that extends from a cylindrical bore section 13 located adjacent one end of the chuck body and another cylindrical bore section 14 located adjacent the opposite end of the body. Annular cable gripper means 15 is provided which is comprised of three arcuate gripper sections or jaws 16 that collectively form, when placed together as shown in the drawing, a structure that has a conical exterior and a cylindrical interior channel 17 provided with serration 18.

The apparatus further comprises an end cap 20 having a central hole therethrough. The end cap is formed with a set of tabs 21 for releasible interlocking engagement with another set of tabs 22 that project inwardly from the cylindrical section 13 of the chuck body bore. With this construction the portion of the end cap 20 that bears the tabs 21 may be inserted into the cylindrical chamber portion 13 of the chuck body bore and rotated so as to bring tabs 21 behind tabs 22 thereby releasibly holding the end cap firmly to the chuck body.

The apparatus also has a bolt indicated generally at 25 which has a hexagon head 26 that is captured within the chuck body by being rotatably positioned within the end cap 20. A shank portion 28 of the bolt extends through the hole in the end cap to the exterior of the chuck body 10. This shank portion may also be considered as constituting a threaded post. A nut 27 is threaded upon and then welded to the shank portion of the bolt closely adjacent the end cap 20, as shown in FIG. 2. A coil spring 29 is mounted within the chuck body 20 so as to spring bias the gripper segments 16 towards a cable entry end provided by the cylindrical bore portion 14.

The apparatus is further seen to comprise a straight coil loop type insert indicated generally at 30 of conventional configuration. The insert has a metal loop 31 in which a coil 32 is welded. In FIG. 2 the insert is seen to be permanently embedded within the concrete structure S with a reenforcing bar B extending through the bit portion 33 of the insert loop. The insert is placed within the structure during its formation so that concrete sets within the loop about the bar B. The insert coil 32 is of a size to threadedly receive the shank 28 of the bolt 25.

The cable anchoring apparatus is assembled by inserting the set of gripper segments into the chuck body and into its bore conical section 12. Spring 29 is then placed within the body with one end in abutment with the gripper segments. The end cap 20, with bolt 25 extending through its hole, is then placed within the cylindrical bore portion 13 and then rotated so as to bring tabs 21 into interlocking engagement with tabs 22. Nut 27 is then threaded upon the shank of the bolt to a position closely adjacent the end cap 20 and then welded in place.

An end of a cable C may now be inserted through the cable insert end 14 of the chuck body 10 and through the set of gripper sections so that the end of the cable is located adjacent the bolt head 26. The cable is then pulled away from the chuck body which causes the gripper sections or jaws to be driven firmly against the inwardly tapered, conical wall 12 of the chuck body bore. Since the exterior of the gripper assembly is also conical, a wedging action is effected causing the grippers to move inwardly all along their lengths and thereby establish firm gripping contact between their serration and the cable.

With the cable now firmly gripped within the chuck the threaded post or bolt 28 is inserted into the entrance of the insert 30. The nut 27 is then wrenched causing the post to rotate since the mount is welded to it. During wrenching the bolt head 26 is permitted free rotation within the end cap and chuck body. Rotation of the bolt by the wrenching of the nut causes it to be screwed into the coil 32 of the insert. This action is continued until the cable C is drawn taut. The cable is now securely anchored by the apparatus to the structure S. Nevertheless, later it may be taken down by merely wrenching nut 27 in the opposite direction which causes the threaded post to be unscrewed from the insert.

FIG. 3 illustrates an alternative form of the invention. Here the cable anchoring apparatus again has an elongated, tubular chuck body 40 that has a conical bore that extends from one body end 41 to another end 42 with a portion of the bore located adjacent end 42 bearing threads 43. Annular cable gripper means are provided, as in the previously described embodiment, which are comprised of three arcuate jaws 44.

The apparatus here further comprises a cylindrical post or bolt denoted generally at 45 which has a head 46 that is rotatably held within the body bore by an end cap 47. The end cap in this embodiment bears threads which are threaded into the body bore threads 43. A compression spring 48 is mounted in the body bore between the bolt head and the grippers. The end of the bolt or post 45 opposite its head is formed with an internally threaded recess 49. A pair of flats 50 are formed on the bolt shank for gripping. Finally, the apparatus includes a conventional drill-in type insert 50 that has expandable ribs 51 on the end that is embedded in a cavity or hole 52 in a concrete structure S which are expanded into gripping engagement with the walls of the hole after the insert has been seated. The insert also has external screw threads 53 on its opposite, exposed end that juts out of the cavity. This type of insert is used on preexisting structures by drilling a hole into the structure as opposed to the straight coil or ferrule insert which is positioned during structure formation.

In use the cable anchoring apparatus of FIG. 3 is generally assembled as before explained with the exception that the end cap 47 is threaded onto the body 40 instead of being interlocked by a twisting motion. The internally threaded post or bolt 45 is threaded onto the insert by rotating or wrenching it with a tool that grips the flats 50. As this is done the bolt head 46 rotates freely within the conical cavity of the body 40 without necessarily any axial change in its position inside the cavity. As the threaded post or bolt 45 is threaded onto the insert threads 53 the body 40 and post 45 are jointly advanced towards the concrete structure 50. In doing so the grippers 44 are urged into a strong gripping engagement with a cable C and the cable is drawn into a tautly anchored position in place.

It thus is seen that apparatus is provided for anchoring the end of the cable to a structure in a relatively easy and quick manner that overcomes problems long associated with anchoring apparatuses and procedures of the prior art. It should however be understood that the just described embodiments merely illustrate principles of the invention in preferred forms. Many modifications, additions and deletions may, of course, be made thereto without departure from the spirit and scope of the invention as set forth in the following claims.

I claim:

1. Apparatus for anchoring the end of a cable to a concrete structure or the like comprising, in combination, a tubular body having an opening in one end into which an end of a cable may be inserted; means for gripping the end of a cable within said tubular body; a threaded post mounted to the other end of said body for free rotation with respect thereto without longitudinal change in position within said tubular body; and an insert adapted to be at least partially embedded in the concrete structure to which insert said post may be threaded without rotation of the tubular body.

2. The apparatus of claim 1 wherein said cable gripping means comprises a set of jaws.

3. The apparatus of claim 1 wherein said tubular body has a conical bore section and wherein said gripping means comprises a set of jaws that collectively have a generally conical exterior surface adapted to be moved within and operatively wedged by said tubular body conical bore section into gripping engagement with a cable end positioned within said jaws.

4. The apparatus of claim 1 further comprising a nut threaded upon and fixedly secured to said threaded post whereby the post may be threaded into the insert by wrenching of the nut.

5. The apparatus of claim 1 wherein said insert is a straight coil loop type insert.

6. The apparatus of claim 1 wherein said threaded post is a shank portion of a bolt that has a head rotatably captured within said tubular body.

7. The apparatus of claim 6 further comprising an end cap mounted to said other body end that has a hole through which said threaded post extends and wherein said bolt head is in rotatable sliding contact with said end cap.

8. Apparatus for anchoring an end of a cable to a support structure comprising a chuck having a tubular body formed with a bore that has a section which tapers inwardly towards a cable insert end into which bore a cable may be inserted, generally annular cable gripper means positioned within said tapered bore section, a threaded bolt having a bolt head rotatably held within an end of said chuck body located opposite to said cable insert end from which an at least partially threaded bolt shank extends to the exterior of said chuck body, and insert means adapted to be at least partially embedded into a support structure into which insert said bolt may be threaded.

9. The apparatus of claim 8 further comprising a spring mounted within said chuck in spring biasing engagement with said cable gripper means.

10. The apparatus of claim 8 further comprising a nut rigidly mounted to said bolt exteriorly of said chuck.

11. The apparatus of claim 8 wherein said insert means comprises a coil loop insert.

12. The apparatus of claim 8 wherein said cable gripper means comprises a plurality of arcuate segments.

13. The apparatus of claim 12 wherein said gripper means plurality of arcuate segments are configured for assembly into a generally annular structure having a tapered outer surface.

* * * * *